Figure 1:
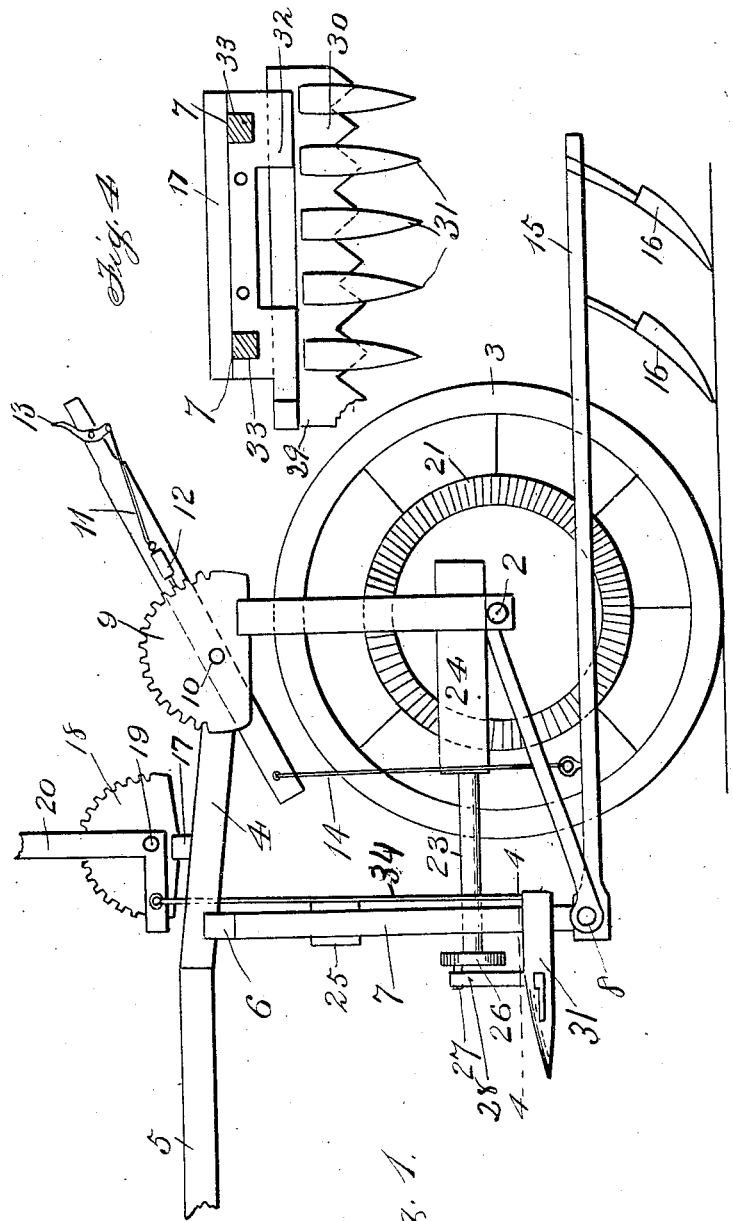

No. 859,109. PATENTED JULY 2, 1907.
A. T. RAY.
COTTON TOPPER.
APPLICATION FILED OCT. 8, 1906.

3 SHEETS—SHEET 1.

Witnesses
Inventor
A. T. Ray
His Attorney

No. 859,109. PATENTED JULY 2, 1907.
A. T. RAY.
COTTON TOPPER.
APPLICATION FILED OCT. 8, 1906.

3 SHEETS—SHEET 2.

No. 859,109. PATENTED JULY 2, 1907.
A. T. RAY.
COTTON TOPPER.
APPLICATION FILED OCT. 8, 1906.

3 SHEETS—SHEET 2.

UNITED STATES PATENT OFFICE.

ARTHUR TAYLOR RAY, OF GEORGETOWN, TEXAS.

COTTON-TOPPER.

No. 859,109.  Specification of Letters Patent.  Patented July 2, 1907.

Application filed October 8, 1906. Serial No. 337,926.

*To all whom it may concern:*

Be it known that I, ARTHUR TAYLOR RAY, a citizen of the United States, residing at Georgetown, in the county of Williamson and State of Texas, have invented certain new and useful Improvements in Cotton-Toppers, of which the following is a specification.

My invention has relation to new and useful improvements in cotton toppers and has for its object the production of a simple and efficiently operating device of this character adapted to be attached in operative position to a cultivator.

With these ends in view my invention consists in the novel construction, combination and arrangement of parts as illustrated in the drawings and set forth in the specification and claims hereunto attached.

Figure 2:
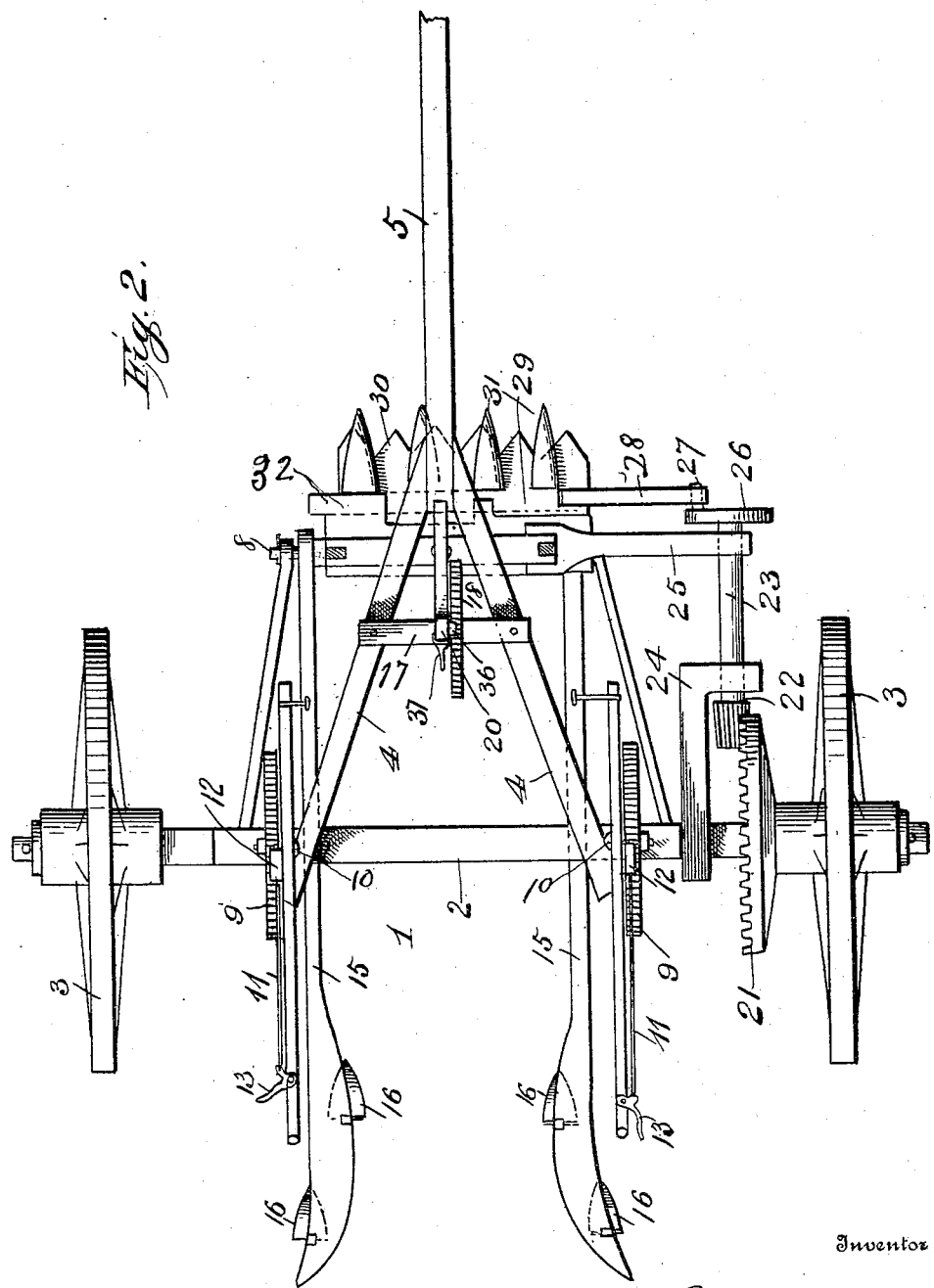
Figure 3:
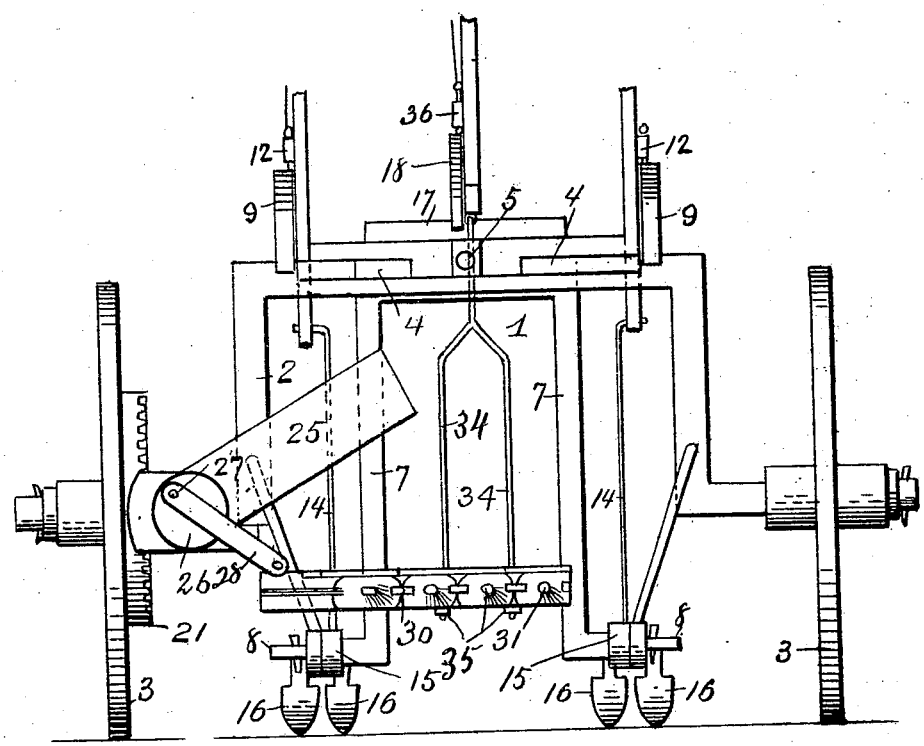

In the accompanying drawings in which like parts are designated by like characters throughout the several views:—Figure 1, is a side elevation of my invention secured in operative position to a cultivator, one of the wheels of the cultivator removed and a section of the draft tongue removed. Fig. 2, is a top plan view of Fig. 1. Fig. 3, is a front elevation of Fig. 1, and Fig. 4, a detail horizontal sectional view, cut on the line 4 4, of Fig. 1.

My invention is described as follows:—The numeral 1, (Fig. 2) represents an ordinary cultivator. Said cultivator is preferably constructed with a bowed axle 2. Journaled on said axle, near its ends, are wheels 3. Secured at their rear ends to the middle of said axle are inwardly extending longitudinal hounds 4, and secured between the front ends thereof, is the rear end of a longitudinal draft tongue 5. A short transverse beam 6, is secured on the upper faces of said hounds, near their front ends, and secured to the ends of said transverse beam, are vertical guide beams 7, the lower ends of which terminate in outwardly extending pivots 8. Rigidly connected near their rear ends to the middle part of said axle 2, adjacent the rear ends of said hounds 4, are two longitudinal segmental toothed racks 9, each of which is provided with a transverse inwardly extending pivot 10. Levers 11, are fulcrumed near their inner ends to said pivots 10 and are provided on their outer sides, adjacent said racks, with spring pawls 12. When in their normal positions, said pawls engage in said racks 9, but are adapted to be thrown out of engagement therewith through the medium of hand levers or grips 13, pivoted to said levers 11, near their rear ends, and connected with said pawls. Secured at their upper ends to said levers 11 near their front ends, are flexible rods 14, which extend downward and connect at their lower ends with the longitudinal plow beams 15 near their front ends; said plow beams are pivoted at their extreme front ends to said pivots 8, of said vertical guide beams 7; and said plow beams are provided near their rear free ends with plow points 16. To raise the rear or free ends of said plow beams 15 and thereby throw the plow points 16 out of contact with the ground, the operator releases the pawls 12 from engagement with said segmental toothed racks 9 by means of said hand levers or grips 13, when the front ends of said levers 11 are free to move upward, and through the medium of said flexible rods 14, raise the rear ends of said plow beams.

Secured to the upper faces of said longitudinal hounds 4, near their front ends, is a transverse supporting beam 17, and secured to the top and near the middle of said beam is a longitudinal segmental toothed rack 18, provided on one of its faces with a transverse pivot 19 (see Fig. 1). Pivoted near its lower part to said pivot 19, of said rack 18, is a bell crank lever 20, the function of which will be hereinafter disclosed. Rigidly connected to said axle 2, adjacent to one of said wheels 3, is a bevel gear 21, adapted to mesh at right angles with a bevel gear 22, (see Fig. 2) secured on the extreme rear end of a longitudinal axle 23; said axle is journaled near its rear end in the transverse arm of a right angled bearing 24, secured at its rear end to said axle 2, inward of said bevel gears 21 and 22, and journaled near its front end in the lower end of an oblique transverse bearing arm 25, secured at its upper end near the upper end of the adjacent beam of said vertical guide beams 7. A disk 26, provided with an eccentric pin 27 on its front face, is rigidly connected on the extreme front end of said axle 23, the function of which will be disclosed. Pivoted near its upper end to said eccentric pin 27, of said disk 26, is a connecting rod or arm 28, which is connected at its opposite end to and is adapted to actuate, a reciprocating blade 29, provided at its front side with a series of longitudinal teeth 30. When in use, the teeth of said transverse reciprocating blade work in corresponding lateral slots in the rear ends of longitudinal fingers 31, located at the front side of a transverse guide plate 32, slidably secured to said vertical guide beams 7 by means of two square vertical perforations 33, in its rear part. The front end of said bell crank lever 20 is removably connected with said transverse guide plate 32 by vertical rods 34, the lower threaded ends of which pass vertically through said guide plate and are provided with nuts 35. Said bell crank lever is equipped with a spring pawl 36 and a grip or hand lever 37. Said grip or hand lever is connected with said pawl through the medium of a connecting rod or other equivalent means. When in use, the said transverse reciprocating blade 29 and transverse guide plate 32 may be raised or lowered and thereby adjusted to suit the height of the cotton crop by releasing said pawl 36 from engagement with said segmental toothed rack 18, and throwing the free end of said bell crank lever up or down, which operation, through the medium of said vertical rods 34, effects an ascension or descension of said blade and guide plate, the said vertical guide beams 7 serving to prevent lateral displacement of same.

Having described my invention, what I claim as new and desire to secure by Letters Patent, is:—

1. In combination with a cultivator having an upwardly bowed axle mounted in wheels, forwardly extending hounds secured near their rear ends to the middle part of said axle and vertical guide beams secured immediately under said hounds near their front ends, a bevel gear, rigidly connected to the inner end of the hub of one wheel; a right angled bearing arm secured at its rear end to said axle inwards of said bevel gear; a bearing arm, secured at its inner end to one of said vertical guide beams; a longitudinal axle, journaled near its ends in the free ends of said bearing arms; a beveled gear, secured on the rear end of said axle, and adapted to mesh with said first mentioned gear; a disk, provided on its front face with an eccentric pin, said disk being secured on the front end of said axle; a transverse guide plate, terminating at its front part in a series of longitudinal fingers, having lateral slots in their rear ends, said guide plate being slidably secured to said vertical guide beams; a transverse reciprocating blade, terminating at its front part in a series of teeth, adapted to work laterally in said guide plate; a connecting arm, pivoted at its outer end to said eccentric pin of said disk, and at its opposite end to the adjacent end of said transverse reciprocating blade; a segmental toothed rack, secured immediately over said longitudinal hounds near their front ends; a bell crank lever, fulcrumed to said rack; vertical rods, removably secured to said transverse guide plate at their lower ends and connected with the front end of said bell crank lever at their opposite ends, and a spring pawl, secured to said lever and adapted to engage with said rack, with means for throwing said pawl out of engagement with said rack, substantially as shown and described and for the purposes set forth.

2. In combination with a cultivator having an upwardly bowed axle mounted in wheels, hounds secured near their rear ends to said axle and vertical guide beams secured immediately under said hounds near their front ends, a bevel gear, rigidly connected to the inner end of the hub of one wheel; a bearing arm, secured to said axle inward of said gear; a bearing arm, secured at its inner end to one of said vertical guide beams; a longitudinal axle, journaled near its ends in said bearings; a bevel gear, secured on the rear end of said axle; a disk, carrying an eccentric pin on its front face, secured on the front end of said axle; a transverse guide plate, terminating at its front part in a series of longitudinal fingers having lateral slots in their rear ends, slidably secured to said guide beams; a transverse reciprocating blade, terminating at its front part in a series of teeth, adapted to work laterally in said guide plate, and a connecting arm, pivoted at its outer end to said eccentric pin of said disk and at its opposite end to the outer end of said blade, with means for raising or lowering said guide plate and for holding said plate at any desired point along said vertical guide beams, substantially as shown and described, and for the purposes set forth.

3. In combination with a cultivator having an upwardly bowed axle mounted in wheels, hounds secured to said axle and vertical guide beams secured immediately under said hounds near their front ends, a transverse guide plate, terminating at its front part in a series of fingers having lateral slots in their rear ends, slidably secured to said vertical guide beams; a transverse reciprocating blade, terminating at its front part in a series of teeth, adapted to work laterally in said guide plate; means for effecting a reciprocating movement of said blade; a segmental toothed rack, secured immediately over said hounds near their front ends; a bell crank lever, fulcrumed to said rack; means for connecting the front end of said lever with said guide plate, and a spring pawl, secured to said lever and adapted to engage with said rack, with means for throwing said pawl out of engagement with said rack, substantially as shown and described and for the purposes set forth.

4. In combination with a cultivator having an upwardly bowed axle mounted in wheels, hounds secured to said axle and vertical guide beams secured immediately under said hounds, a transverse guide plate, terminating at its front part in a series of fingers having lateral slots in their rear ends, slidably secured to said vertical guide beams; a transverse reciprocating blade, adapted to work in said guide plate, and means for effecting a reciprocating movement of said blade, with means for raising or lowering said guide plate and for holding it at any desired point along said vertical guide beams, substantially as shown and described and for the purposes set forth.

In testimony whereof I have signed my name to this specification in the presence of two subscribing witnesses.

ARTHUR TAYLOR RAY.

Witnesses:
 CHARLES H. GEE,
 SAMPSON CONNELL.